United States Patent
Bales et al.

(10) Patent No.: US 7,814,409 B2
(45) Date of Patent: Oct. 12, 2010

(54) SYSTEM AND METHOD FOR CONFIGURING A DOCUMENT

(75) Inventors: Christopher E. Bales, Boulder, CO (US); Nathan Olson, Broomfield, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/167,697

(22) Filed: Jun. 27, 2005

(65) Prior Publication Data

US 2006/0294457 A1    Dec. 28, 2006

(51) Int. Cl.
*G06F 17/00* (2006.01)
(52) U.S. Cl. .................. 715/234; 715/243; 715/235
(58) Field of Classification Search .................. 715/513
See application file for complete search history.

(56) References Cited

U.S. PATENT DOCUMENTS

| | | | |
|---|---|---|---|
| 6,996,778 B2 | 2/2006 | Rajarajan et al. | |
| 7,346,840 B1 * | 3/2008 | Ravishankar et al. | 715/234 |
| 2004/0113938 A1 * | 6/2004 | Akerfeldt | 345/738 |
| 2004/0123238 A1 * | 6/2004 | Hefetz et al. | 715/513 |
| 2005/0015491 A1 * | 1/2005 | Koeppel | 709/226 |
| 2006/0129935 A1 * | 6/2006 | Deinlein et al. | 715/733 |

* cited by examiner

*Primary Examiner*—Boris Pesin
(74) *Attorney, Agent, or Firm*—Fliesler Meyer LLP (57) ABSTRACT

Embodiments of the present invention enable efficient presentation of user information. A user identifier is presented on a page. In response to a selection of a user identifier, one or more user information modules are utilized to return information relating to the user. The user information modules are modules that maintain user information in association with a user. In one embodiment, a configurable java server tag function generates the presentation of the user identifier, which can then be selected and utilized to request information from one or more information sources.

9 Claims, 6 Drawing Sheets

SYSTEM AND METHOD FOR CONFIGURING A DOCUMENT

CROSS REFERENCE TO RELATED APPLICATIONS

U.S. patent application Ser. No. 11/167,702 entitled SYSTEM AND METHOD FOR IMPROVED USER INFORMATION MANAGEMENT, by Christopher Bales et al., filed on Jun. 27, 2005, now U.S. Pat. No. 7,451,400, issued Nov. 11, 2008.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the delivery of web portal content. More specifically, it relates to improved techniques for configuring a document.

BACKGROUND OF THE INVENTION

During the past five years, web portals, which provide access to a variety of applications and content through a single location have become increasingly popular. Whereas web portals and pages have historically been used only for basic information presentation to remote users, they have more recently become a platform providing more complicated information delivery tasks both remotely and within organizations. For example, portals have begun to be used to provide a number of organizational and human resource functions within institutions such as universities and large businesses. Thus, informational applications, which were once the province of customized databases, are now being delivered through web portals and pages.

However, current implementations of user information delivery are still lacking in their efficacy. Often the interface and functional components are coupled, making expansion and modification difficult.

What is needed is a more flexible mechanism for configuring a document.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Embodiments of the present invention provide methods and mechanisms for providing information from an external source into a document, such as a web page, for example. These methods and mechanisms can enable a current version of dynamically updated information to be displayed in association with an identifier on a web page or other document. A developer or other user may configure parameters such as what information is displayed, how it is displayed and what identifiers are associated with the information by configuring a tag embedded in the document source. Some embodiments provide more efficient presentation and update of user information.

In an embodiment, an identifier is presented on a page. In response to a selection of the identifier, one or more information modules are utilized to return information relating to the identifier. The information modules are modules that maintain information in association with an identifier. In one embodiment, a configurable Java™ Server Pages tag function generates the presentation of the user identifier, which can then be selected and utilized to request information from one or more information sources. (Java™ is a trademark of Sun Microsystems, Inc.)

In an embodiment, a method for presenting information is provided. One embodiment of the method includes detecting in a web page source, an identifier corresponding to a dynamically configurable link. Updated information is retrieved from an external data source in accordance with the identifier. A link is displayed as part of a web page. The link providing at least a portion of the updated information responsive to detecting an input from a user.

In another embodiment, a method for configuring a document is provided. One embodiment of the method includes receiving a designation of identifiers for which information can be presented in the document. A designation of at least one information source is also received. An association between the at least one information source and the document is generated such that at least one reference associated with the identifiers and the at least one information source is included in the document.

While the present invention is described with reference to an embodiment in which the information delivered relates to users, the present invention is not limited to user information, and in fact, in alternate embodiments, any information related to an identifier can be managed using the techniques described herein.

Figure 1:
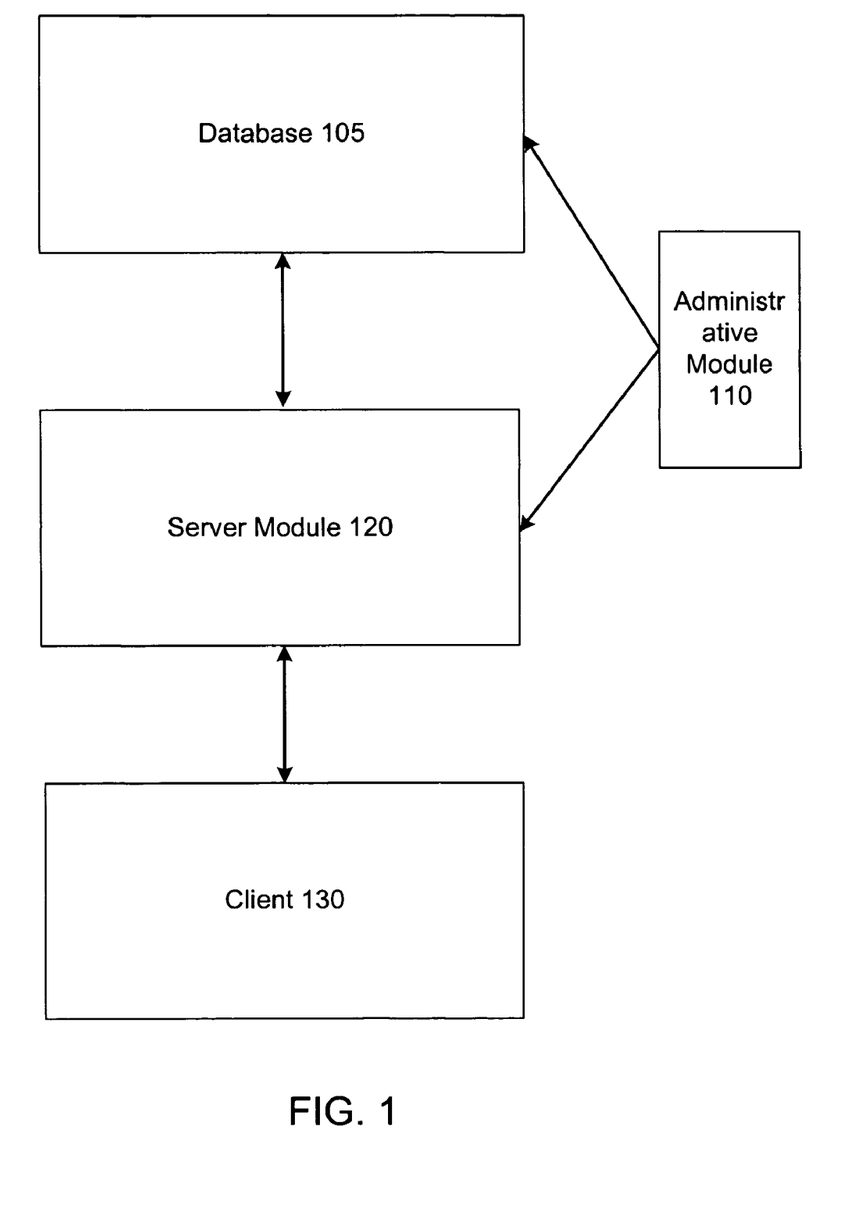
FIG. 1 illustrates a high-level view of one embodiment of a system for presenting user information.

FIG. 1 illustrates a high-level view of one embodiment of a system for creating and delivering user information. The system includes an administrative module 110, one or more databases 105, a server module 120, and a client 130. The administrative module 110, database 105, server module 120, and client 130 can be connected through one or more networks. The networks can include but are not limited to: public and/or private networks, wireless networks, optical networks, and satellite based communication links. Other suitable communication means can include but are not limited to: random access memory, file system(s), distributed objects, persistent storage, and inter-processor communication networks. The server module 120 is a server that supports a web portal and various Java applications. In one embodiment, the server module 120 utilizes WebLogic® Server, available from BEA Systems. The one or more databases 105 can include but are not limited to: relational databases, object-oriented databases, file systems, or any other kind of persistent storage. In one embodiment, the databases store portal content that is manipulated through the administrative module 110 and accessed by the server 120 during its operation. The administrative module 110 is user interface that can be remote or local to the server module 120 that is used to configure, modify, and extend the server 120.

The client 130 is a system that is used to access user information provided by the server module 120. The client 130 can be a thin client or a fully functional system having its own processing and storage. The client typically includes a web browser for accessing content maintained by the server. It should be understood that though these systems are presented as logically separate, that they can be grouped together as any number of systems.

Figure 2:
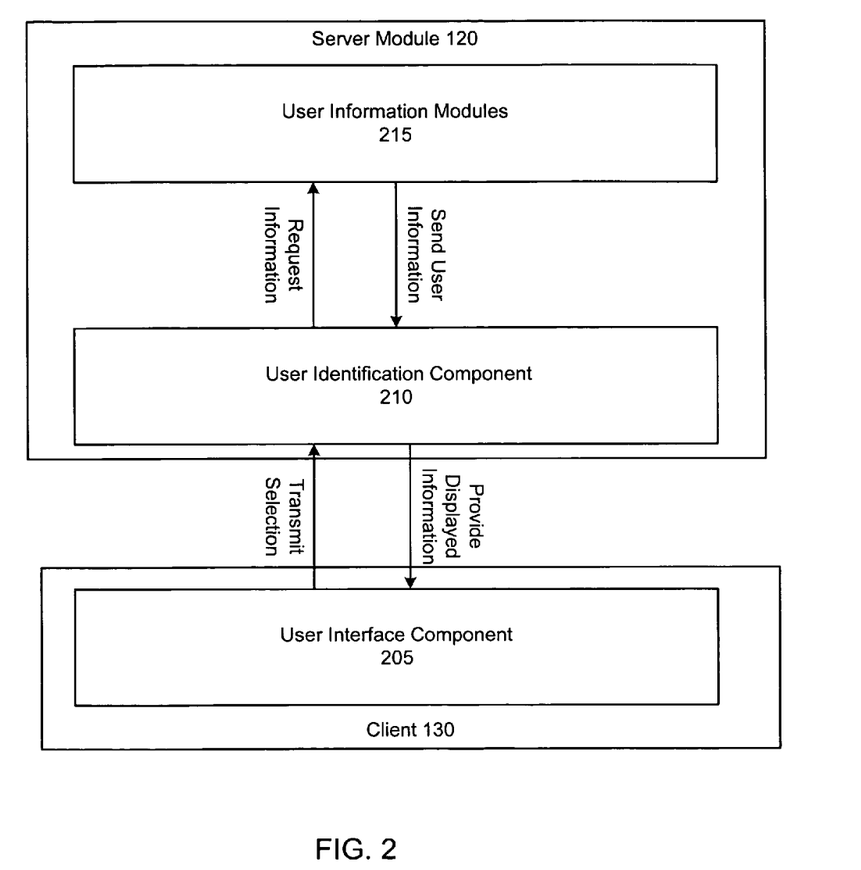
FIG. 2 illustrates another high-level view of a system for providing user information.

FIG. 2 illustrates another high-level view of a system for providing user information. The server module 120 includes one or more user information modules and a user identification component 210 that interact with user interface component 205 on the client 130. The user identification component 210 provides interface information to the user interface component 205 for the purposes of displaying user information. In one embodiment, the user identification component 210 is a component residing on the server module 120 that dynamically generates HyperText Markup Language (HTML) for rendering by the client.

The user information modules comprise 215 one or more functions that provide information about a user. While the user information modules 215 are illustrated as residing on the server, in alternate embodiments, they can be external to the server. They can include various databases, search engines, messenger client directories, electronic mail directories, telephone directories, and/or any other resources that provide information about a user. They can be accessed through various Java instructions, Javascript instructions or through the use of generated hyperlinks. They can be configured to return data on a per-request basis, or to stream data. For example, one embodiment of a user information module could be a search directory that returns information in response to a user-specific hyperlink (e.g. a search for "Chris" can be set as http://www.google.com/search?hl=en&q=Chris&btnG=Google+Search). Other user information modules 215 might only be accessed through various program calls.

The user identification component generates the user interface component 205 for display on the client 130. The user interface component is configured to provide selectable information about the user and in response to a selection of the selectable information, returns more detailed information about the user. For example, the user identification component could generate a user directory entry for display on the client, and when an item is selected from the user interface directory, a request is submitted for additional information about the user. In some embodiments, the request is transmitted directly to the user information modules. In alternate embodiments the request for information is provided through the user identification component 210. The user interface component 205 can include any number of forms or configurations. In one embodiment, the user interface component comprises a web page displayed on a browser on the client 130.

In some embodiments, the user interface component 205 is rendered HTML document that is generated partially or wholly by the user identification component 210 from a Java Server Page (JSP). In these embodiments, the user identification component 210 is a component that reads one or more tags within the JSP to generate a page that is displayed on the client 130. Enclosed below is one example of a tag that when parsed by the user identification component 210 can be used to present the name of a user associated with a username.

<activenames:activenames JoeSmith=<%=request.getRemoteUser( ) %>style="color:red"/>

This user identification component 210, upon reading this tag would send a request associated with the username "joe-smith" to a user directory (one of the user information modules) and receive a name field back that can be presented as the link (e.g. "Joseph Smith".

The link itself would also be able to utilize the user information modules 215 to access more detailed information about the user. In one embodiment, this information is presented through a graphical overlay that is presented on the web page. The graphical overlay can include one or more fields or rows, each row presenting information about the user for each of the user information modules 215.

The particular more detailed information can be generated on the server side and returned to the user interface component. Alternately, it can be generated and stored, as per the tag, into the HTML of the page to be presented on the browser. In one embodiment, the user identification component utilizes a configuration file to determine which of the user information modules are used to provide information about the user in response to a selection. This configuration file can be utilized by the user identification component when interpreting the tags to generate the HTML for the user interface component 205. By way of illustration, the following XML document represents an exemplary configuration file:

```
- <activeNamesConfig xmlns="http://www.bea.com/servers/apps/communities/ui/active-
    names-config" xmlns:xsi="http://www.w3.org/2001/XMLSchema-instance"
    xsi:schemaLocation="http://www.w3.org/2001/XMLSchema
    http://www.w3.org/2001/XMLSchema.xsd">
  - <activeNameDefault>
      <activeNameText
          className="com.bea.apps.communities.utils.GetUserNameFromProfile"
          methodName="getName" />
      <activeNameStyle class="popup" style="color:#000000" />
    </activeNameDefault>
  - <menuItem>
      <xmlHttp url="GetFirstNameServlet" />
    </menuItem>
  - <menuItem default="true">
      <link name="Google" url="http://www.google.com" />
```

```
        </menuItem>
        <!--
        Sample Action Menu Item
            <menuItem>
                <action name="This is a Test Action" action="actionName"/>
            </menuItem>
        -->
</activeNamesConfig>
```

The configuration file provides several different types of user information, each of which can be presented under a "<menuItem>" header within the configuration file. The configuration file can include one or more links that are configured for the user, and call one or more modules. For example, the <menuItem> header for <GetFirstNameServlet> causes the user identification component to utilize a <GetFirstNameServlet> to generate text indicating a user's first name. In some embodiments, the configuration file also includes a "look and feel" setting that indicates the visual characteristics of the presented information. The look and feel information can be specified within the configuration file itself or by referencing a Cascading Style Sheet (CSS) document specifying look and feel settings.

While in the present embodiment, the configuration file is an eXtensible Markup Language (XML) document, in alternate embodiments, other formats can be used.

Figure 3:
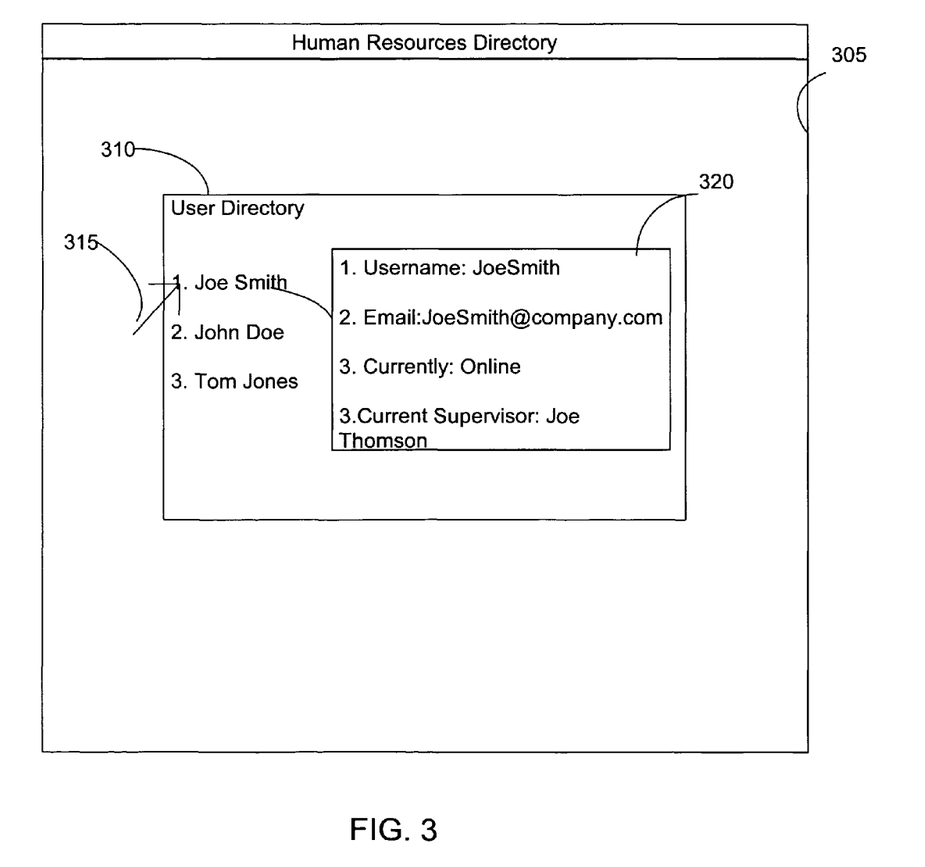
FIG. 3 illustrates a high-level view of one embodiment of a generated interface that provides user information.

FIG. 3 illustrates a high-level view of one embodiment of a generated interface that provides user information. An interface 305 displays a user directory 310 that includes one or more user identifiers. Through the use of a pointing indicator 315, an overlay menu 320 is generated indicating additional information about the user. While the illustrated interface is a human resources directory, it should be understood that any resource or application where user information is utilized could be used.

The page 305 can be generated by the user identification component 210 and rendered on the user interface component 205. In one embodiment, the page 305 is generated from a JSP by the user identification component 210 and provided as HTML for display by the user interface component 205.

The user directory section 310 displays one or more names of users. In one embodiment, the user identification component, in generating the interface for rendering by the user interface component 205, takes user information that is in the form of user identifiers (e.g., usernames), submits them to a user directory from among the user information modules 215, and receives the names of the users, which are then provided as markup for rendering and display by the user interface component 205.

By selecting one of the names, an overlay menu 320 is presented. While a pointing indicator is used in the present embodiment, in alternate embodiments, voice interfaces, touchscreens, gesture interpreters, or any other interface or combination thereof can be used. In one embodiment, the pointing indicator is a mouse and the menu is presented in response to a right-click action with the mouse.

Each of the fields on the overlay window 320 is associated with one of the user information modules, as per the configuration file. The illustrated window includes a system username for the user, an email address, whether the user is logged into the system, and an identity of a current supervisor for the user. The email address field can be generated as a clickable HTML mail to: link that can be used to email the user. The overlay is generated by the user identification component, which utilizes the information in the configuration file to generate markup for the window, which is then rendered by the user interface component 205. The information in the overlay window can be static or dynamic (updated continuously without reloading the page). For example, the page might be configured to utilize eXtensible Markup Language HyperText Transport Protocol (XMLHTTP) data, which streams information continuously.

Figure 4:
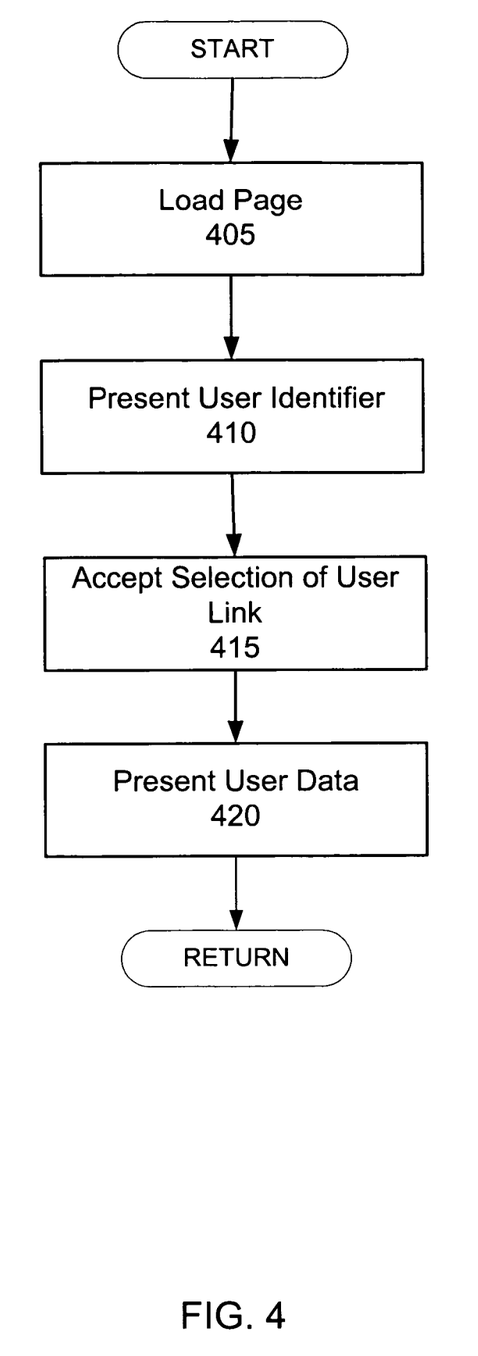
FIG. 4 illustrates a high-level view of one embodiment of a process for providing user data.

FIG. 4 illustrates a high-level view of one embodiment of a process for providing user data. In one embodiment this process is performed by the client 130. In block (405) a page is loaded. In some embodiments, the page is generated dynamically by the user identification component 205 and the markup rendered on the client by the user interface component 205.

In block (410) the user identifier is presented. In some embodiments, the user identifier is a username. In alternate embodiments, during the page generation process, the user identification component 210, when generating the page, accesses one of the user information modules 215 and stores a formal name or nickname for the user in the markup for the page to be presented.

In block (415) a selection of the user identifier is received. This selection can be received through a pointing indicator or some other type of selection mechanism. In block (420), the user data, in the overlay window 320 is presented. In some embodiments, the additional information in the overlay window is stored in the page when it is generated by the user identification component. In alternate embodiments, selection of the link sends a request to the user identification component 210, which updates the page to be re-rendered on the client 130.

Figure 5:
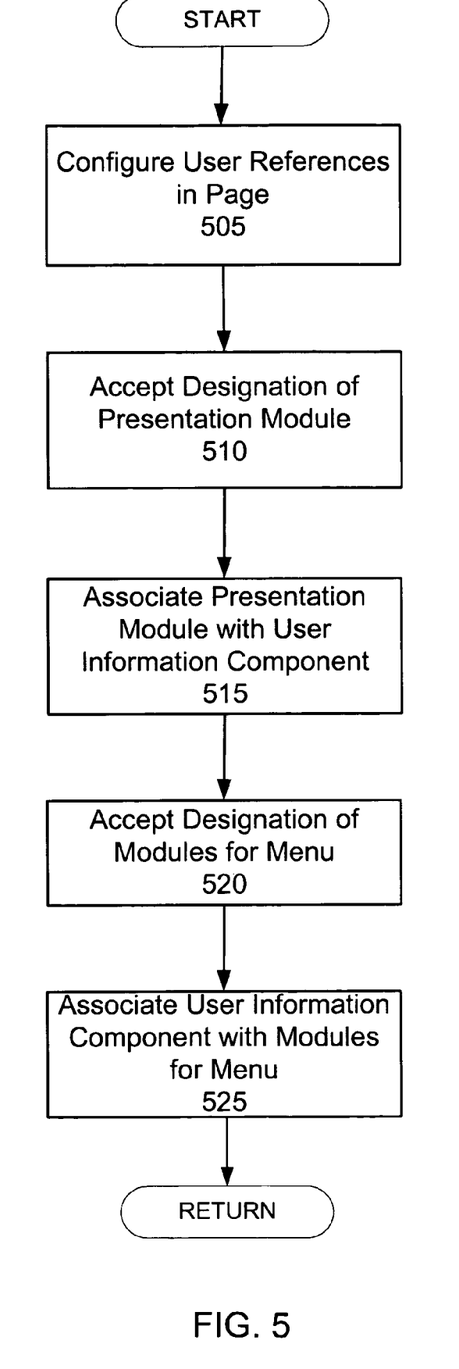
FIG. 5 illustrates a high-level view of one embodiment of a process for associating user information modules with a page.

FIG. 5 illustrates a high-level view of one embodiment of a process for associating user information modules with a page. In some embodiments this process is performed by the admininstrative module 110. In block (505), one or more user references is stored in the page. In the case of a JSP this entails storing one or more tags in the page that are configured to provide user information. In block (510), the system accepts the designation of a presentation module. The presentation module is the module that is utilized to provide the text link that is initially presented on the page. In some embodiments, the presentation module is merely a user directory that returns a proper name in response to a username. In some embodiments, this processing of block (510) is performed by modifying a configuration file. In one embodiment, the configuration file is an XML document and the <activeNameText> heading indicates a module that can be used to generate the presented text.

In block (515) the user identification component 210 checks the configuration file and configures itself with the user information module designated for the initial presentation of the link. In some embodiments, this processing is not performed during a configuration stage, but is instead performed dynamically when the page is generated.

In block (520) the modules for the graphical overlay 320 are designated. In one embodiment, the processing of block (520) is performed by designating the relevant modules in the configuration file. In some embodiments, the configuration file is an XML document that includes one or more headings (e.g <menuItem>) each of which designates a user information module to provide user information for one of the lines in the menu.

In block (525) the user identification component 210 checks the configuration file and configures itself with the user information modules designated for each of the menu items. In some embodiments, this processing is not performed during a configuration stage, but is instead performed dynamically when the page is generated.

Figure 6:
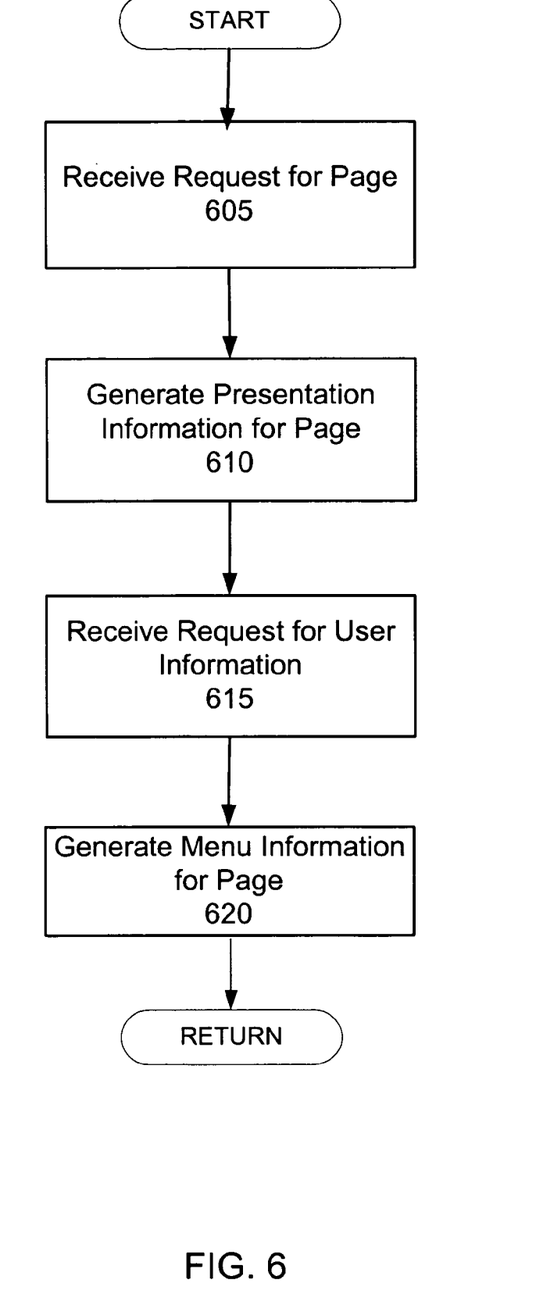
FIG. 6 illustrates a high-level view of one embodiment of a process for generating user information.

FIG. 6 illustrates a high-level view of one embodiment of a process for generating user information. In one embodiment this process is performed by the user identification component 210, though in alternate embodiments other systems can be used. In the current embodiment, this process is performed when a page displaying user information is requested, but in alternate embodiments, it can be performed at other times. It should be understood that while the present embodiment utilizes HTML for the presentation of the page, that in other embodiments, other types of document construction can be used. Similarly, though the present embodiment discusses JSPs, in other embodiments, different document generation mechanisms can be used.

In block (605) a request is received for the page. This processing can occur when a user of the client attempts to navigate to the page or at some other time. The server 130, upon receiving the request, directs the user identification component 210 to generate the page. In block (610), the user identification component 210 generates the presentation information for the page. In some embodiments, the user identification component 210 is a component that parses JSPs to generate markup that can be displayed on a client browser. In these embodiments, the user identification component would detect the presence of one or more <activenames> tags associated with various users and utilize the configured user information module designated as the presentation module (as referenced in the configuration file). The user identification component 210 would then use information from the designated presentation module to generate the HTML that can be rendered to present the links for each of the users specified in each of the tags.

For example, during the processing of block (610), the user identification component 210 could detect the presence of one or more <activenames> tags listing a username. The user identification component could then submit the username to a directory of nicknames or a directory listing full names with titles (the designated presentation module), receive the full name or nickname in response from the directory, and generate HTML listing the titled name to be rendered on the client 130.

In block (615), a request is received for user information. In some embodiments, the processing of block (615) is performed when a selection of one of the presented user links is selected on the page. The links can be configured to call the user identification component 210 when a selection is made. This can be achieved through the use of a standard HTML link embedded in the generated page and attached to the presentation text or some other mechanism.

In block (620) the system generates the information in the menu for the page in response to the request. In those embodiments, in which the page is generated through the use of JSP tags, the user identification component uses the configuration information in the configuration file to generate HTML code to be rendered on the client that will present the graphical overlay 320. During this step, the user identification component submits a request associated with the selected user to each of the modules designated for the menu and receives information for them.

Referring to the example illustrated in FIG. 3, the user identification component 210 would submit requests to user information modules providing usernames, email addresses, online statuses, and current supervisors. Upon receiving this information, the user identification component 210 would generate markup that would be rendered on the client as the presented overlay. In some embodiment, the generated HTML is organized so a group of rows is presented, with each row associated with one of the user information modules.

In some embodiments, block (620) is not performed in response to a request, but is instead performed when the page is generated in block (605). In these embodiments, the markup for the menu can be stored in the original page and presented by the client 130 in response to a selection of the presented user information.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/ specialized computer or microprocessor are software modules for implementing the teachings of the present invention.

What is claimed:

1. A method for configuring a document, the method comprising:
   receiving, at a server, a selection of a plurality of identifiers, wherein information about the identifiers can be presented in the document;
   determining from a configuration file
      a plurality of information sources, at the server, that provides the information about the identifiers,
      look and feel settings for presenting the information about the identifiers in the document, and
      one or more menu items, for a menu, wherein a different menu is associated with each identifier, to be presented in the document, wherein the one or more menu items include dynamically updated information associated with that identifier, and wherein the one or more menu items are displayed in the menu associated with the selected identifier;
   generating a reference between the plurality of information sources and the document including generating at least one Java Server Page (JSP) tags in the document, such that when the at least one JSP tags is parsed to render the document;
   including the reference in the document;
   wherein the reference comprises instructions for accessing information about the identifiers from the plurality of information sources designated in the configuration file, instructions for accessing from the configuration file the look and feel settings for presenting information about the identifiers in the document, and instructions for presenting in the document the one or more menu items designated in the configuration file including the one or more dynamically updated information item associated with the identifiers;
   generating markup for the document, wherein the markup, when rendered by a client, enables a client to display the document including the information associated with the plurality of identifiers included in the selection; and
   returning the markup for the document in response to the selection.

2. The method of claim 1, wherein receiving a designation of identifiers comprises:
   receiving at least one username in a user directory.

3. The method of claim 1, wherein the plurality of information sources comprises a search engine and the at least one reference comprises hyperlinks for accessing information about the identifiers from the search engine.

4. The method of claim 1, wherein the plurality of information sources comprises a user directory.

5. A computer readable storage medium comprising instructions that when executed by a processor cause a system to:
   receive, at a server, a selection of a plurality of identifiers, wherein information about the identifiers can be presented in the document;
   determine from a configuration file
      a plurality of information sources, at the server, that provides the information about the identifiers,
      look and feel settings for presenting the information about the identifiers in the document, and
      one or more menu items, for a menu, wherein a different menu is associated with each identifier, to be presented in the document, wherein the one or more menu items include dynamically updated information associated with that identifier, and wherein the one or more menu items are displayed in the menu associated with the selected identifier;
   generate a reference between the plurality of information sources and the document including generating a web page from a Java Server Page (JSP);
   include the reference in the document;
   wherein the reference comprises instructions for accessing information about the identifiers from the plurality of information sources designated in the configuration file, instructions for accessing from the configuration file the look and feel settings for presenting information about the identifiers in the document, and instructions for presenting in the document the one or more menu items designated in the configuration file including the one or more dynamically updated information item associated with the identifiers;
   generate markup for the document, wherein the markup, when rendered by a client, enables a client to display the document including the information associated with the plurality of identifiers included in the selection; and
   return the markup for the document in response to the selection.

6. The computer readable storage medium of claim 5, wherein the instructions that when executed by a processor cause a system to receive a designation of identifiers include instructions that cause the system to:
   receive at least one username in a user directory.

7. The computer readable storage medium of claim 5, wherein the plurality of information sources comprises a search engine and the at least one reference comprises hyperlinks for accessing information about the identifiers from the search engine.

8. The computer readable storage medium of claim 5, wherein the plurality of information sources comprises a user directory.

9. A system for configuring a document, the system comprising:
   a plurality of information sources configured to provide information about users; and
   an administrative component configured to
      receive a selection of a plurality of identifiers, wherein information about the identifiers can be presented in the document;
      determine from a configuration file
         a plurality of information sources, at the server, that provides the information about the identifiers,
         look and feel settings for presenting the information about the identifiers in the document, and
         one or more menu items, for a menu, wherein a different menu is associated with each identifier, to be presented in the document, wherein the one or more menu items include dynamically updated information associated with that identifier, and wherein the one or more menu items are displayed in the menu associated with the selected identifier;
      generate a reference between the plurality of information sources and the document including generating a web page from a Java Server Page (JSP);
      include the reference in the document;
      wherein the reference comprises instructions for accessing information about the identifiers from the plurality of information sources designated in the configuration file, instructions for accessing from the configuration file the look and feel settings for presenting information about the identifiers in the document, and instructions for presenting in the document the one or more menu items designated in the configuration file including the one or more dynamically updated information item associated with the identifiers;

generate markup for the document, wherein the markup, when rendered by a client, enables a client to display the document including the information associated with the plurality of identifiers included in the selection; and return the markup for the document in response to the selection.

\* \* \* \* \*